United States Patent Office 3,523,981
Patented Aug. 11, 1970

3,523,981
DIMERS OF ALPHA-METHYL STYRENE AND ITS HOMOLOGUES
Gerhard F. Ottmann, Wuppertal-Elberfeld, Germany, and Haywood Hooks, Jr., West Haven, Conn., assignors to Olin Corporation, New Haven, Conn., a corporation of Virginia
No Drawing. Filed Feb. 27, 1969, Ser. No. 803,099
Int. Cl. C07c 3/20, 15/22
U.S. Cl. 260—668          10 Claims

ABSTRACT OF THE DISCLOSURE

A process for preparing dimers of alpha-methyl-styrene and/or homologues thereof by heating to a temperature in a range of between about 25 and about 250° C. in the presence of a noble metal based catalyst.

---

This invention relates to a process for the dimerization of alpha-methylstyrene and homologues thereof.

U.S. Pat. No. 3,161,692, issued Dec. 15, 1964, to Robert L. McLaughlin et al., describes a process for polymerizing alpha-methylstyrene and its homologues at a temperature of between 140° C. and 150° C. in the presence of an acid activated montmorillonite type clay. The resulting products are useful as heat transfer fluids and lubricants which resist degradation when subjected to a wide range of temperatures.

It is an object of this invention to provide a novel technique for dimerizing alpha-methylstyrene and its homologues to form 1,1,3-trimethyl-3-phenyl indane and its homologues.

More specifically it is an object of this invention to provide a method for preparing 1,1,3-trimethyl-3-phenyl indane.

Another specific object of the invention is to provide a novel method for preparing 1-methyl-3-phenyl indane.

These and other objects of the invention are accomplished when alpha-methylstyrene or homologues thereof are heated to a temperature in the range of between about 25 and about 250° C. in the presence of a noble metal based catalyst, and recovering the product of 1,1,3-trimethyl-3-phenyl indane, or its homologues.

Alpha-methylstyrene and its homologues are suitable for dimerization by the novel process of this invention and are represented by the formula

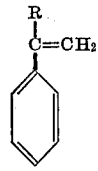

where R is a substituent selected from the group consisting of hydrogen and an alkyl containing between about 1 and about 4 carbon atoms. Suitable alkyl substituents include methyl, ethyl, propyl, isopropyl, butyl, secondary butyl and tertiary butyl. Mixtures of these alpha-methylstyrene type compounds may be dimerized in accordance with the process of this invention. The cyclic dimer product is represented by the following formula

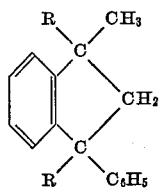

where R has the definition recited above. When a mixture of two or more alpha-methylstyrene compounds is dimerized, it will be recognized that each R will be different, and will depend upon the R substituents in the starting materials. For example, when the starting material is solely alpha-methylstyrene the dimer product is 1,1,3-trimethyl-3-phenyl indane and when the starting material is styrene the dimer product is 1-methyl-3-phenyl indane. When a mixture of alpha-methylstyrene and styrene is dimerized, not only will the two above substituted indanes be obtained, but the product will also contain 1,1-dimethyl-3-phenyl indane and 1,3-dimethyl-3-phenyl indane.

The catalyst for the dimerization reaction of this invention is comprised of a noble metal based catalyst. The noble metal may be used either in a metallic, alloy or chemically combined state. It may be deployed either with or without a physical support. Among the noble metals which can be employed are platinum, palladium, ruthenium, rhodium, osmium, silver, gold and iridium. Among the chemical forms of compounds of these metals which can be used herein are oxides, sulfates, nitrates, halides, carbonates, sulfides, oxalates, mixtures thereof, and the like. Typical useful compounds of noble metals include platinum oxide, platinum dioxide, platinous cyanide, and platinum sulfate; palladium oxides such as palladium suboxide ($Pd_2O$), palladium monoxide (PdO), and palladium dioxide ($PdO_2$); rhodium oxides such as rhodium monoxide (RhO), rhodium sesquioxide ($RH_2O_3$), and rhodium dioxide ($RHO_2$); ruthenium oxides such as ruthenium hydroxide [$Ru(OH_2)$], ruthenium dioxide ($RuO_2$), and ruthenium tetraoxide ($RuO_4$); halides of the noble metals such as palladous dibromide, palladous dichloride, palladous diiodide, rhodium tribromide, rhodium trichloride, rhodium trifluoride, rhodium triiodide; platinic bromide, platinous bromide, platinic chloride, platinous chloride, platinic fluoride, platinous iodide, platinic iodide, rhenium trichloride, rhenium tetrachloride, rhenium tetrafluoride, rhenium hexafluoride, rhenium tribromide, ruthenium trichloride, ruthenium tetrafluoride, ruthenium pentafluoride, iridium tribromide, iridium tetrabromide, iridium dichloride, iridium trichloride, iridium tetrachloride, iridium triiodide, and iridium tetraiodide; and mixtures thereof. The preferred noble metal based catalysts are palladous dichloride, rhodium trichloride and ruthenium trichloride.

The physical form of the catalyst can be varied to suit particular needs. The noble metal based catalyst can be self-supported or deposited upon a support which disperses the metals so as to increase active surface area. Such porous supports include alumina, silica, carbon, barium sulfate, calcium carbonate, asbestos, bentonite, diatomaceous earth, fuller's earth, and the like.

The reaction is carried out in the presence of a catalytic proportion of the noble based catalyst. The proportion of noble metal based catalyst is generally equivalent to between about 0.1 and about 100 percent, and preferably between about 1 and about 60 percent by weight of the styrene compound. However, greater or lesser proportions may be employed if desired.

The process of this invention operates effectively in the absence of a solvent, but improved overall yields of the substituted indanes can be obtained when a solvent which is chemically inert to the components of the reaction system is employed. Suitable solvents include aliphatic, cycloaliphatic and aromatic solvents such as n-heptane, cyclohexane, benzene, toluene, and xylene, and halogenated aliphatic and aromatic hydrocarbons such as dichloromethane, tetrachloroethane, monochloronaphthalene, monochlorobenzene, dichlorobenzene, trichlorobenzene, mixtures thereof and the like.

The proportion of solvent is not critical and any proportion may be employed which will not require excessively large equipment to contain. Generally the weight percent of the styrene compound in the solvent is in the range between about 2.0 and about 75 percent, but greater or lesser proportions may be employed if desired.

The reaction temperature is generally maintained above about 25° C. and preferably between about 100 and about 250° C. Interior and/or exterior heating and cooling means may be employed to maintain the temperature within the reactor within the desired range.

The reaction time is dependent upon the styrene compound being reacted, temperature, pressure, and on the amount of catalyst being charged, as well as the type of equipment being employed. Usually between about ten minutes and about 20 hours are required to obtain the desired degree of reaction in a batch technique, but shorter or longer reaction times may be employed. In a continuous process, the reaction period may be much lower, i.e., substantially instantaneous, and residence time may be substantially less than batch reaction time.

The reaction can be carried out batchwise, semi-continuously or continuously in any suitable reactor.

After the reaction is completed, the temperature of the crude reaction mixture may be dropped to ambient temperature, the pressure vessel is vented, and the reaction products are removed from the reaction vessel. Filtration or other suitable solid-liquid separation techniques may be employed to separate the catalyst from the reaction product, and fractional distillation is preferably employed to isolate the substituted indane from the reaction mixture. However, other suitable separation techniques such as extraction, sublimation, etc., may be employed to separate the substituted indane from the unreacted styrene compound and any by-products that may be formed.

The following examples are presented to describe the invention more fully without any intention of being limited thereby. All parts and percentages are by weight unless otherwise specified.

EXAMPLE 1

A 100 ml. autoclave was charged with 20 g. of alpha-methylstyrene, 40 ml. of chlorobenzene, 0.8 g. of rhodium trichloride, and 0.8 g. of palladium dichloride. The reaction vessel was closed, flushed with nitrogen, and heated for two hours at 190° C. with rocking. Fractional distillation of the reaction mixture after filtration gave 1,1,3-trimethyl-3-phenyl indane, B.P. 88.5° C./0.07 mm. Hg; M.P. 52–53 C., yield: 15.4 g. ( 75 percent of the theory).

Analysis.—Calcd. for $C_{18}H_{20}$ (percent): C, 91.47; H, 8.53. Found (percent): C, 91.36; H, 8.40.

EXAMPLE 2

Alpha-methylstyrene (20 g.) in 40 ml. of chlorobenzene was heated in the presence of 0.8 g. of rhodium trichloride as outlined in Example 1. This experiment afforded 15.0 g. of 1,1,3-trimethyl-3-phenyl indane.

EXAMPLE 3

The experiment described in Example 2 was repeated but in the present of 0.8 g. of palladium dichloride instead of rhodium trichloride. This run afforded 11.5 g. of 1,1,3-trimethyl-3-phenyl indane.

Various modifications of the invention, some of which have been disclosed above, may be employed without departing from the spirit of the invention.

What is desired to be secured by Letters Patent is:

1. A process for preparing substituted indanes of the formula

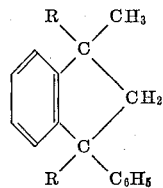

where each R is a substituent selected from the group consisting of hydrogen and alkyl containing between about 1 and about 4 carbon atoms which comprise heating a styrene compound of the formula

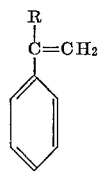

where R has the same definition as above to a temperature in the range between about 25 and about 250° C. in the presence of a noble metal based catalyst.

2. The process of claim 1 wherein the proportion of noble metal based catalyst is between about 0.1 and about 100 percent by weight of said styrene compound.

3. The process of claim 2 wherein said noble metal based catalyst is selected from the group consisting of platinum, palladium, ruthenium, rhodium, osmium, gold, silver and iridium.

4. The process of claim 3 wherein said noble metal is an element dispersed on a porous support.

5. The process of claim 3 wherein said noble metal based catalyst is a compound of a noble metal selected from the group consisting of oxides, sulfates, nitrates, halides, carbonates, sulfides, oxalates and mixtures thereof.

6. The process of claim 5 wherein the temperature is in the range of between about 100 and 250° C., and the pressure is in the range of between about 30 and about 10,000 p.s.i.g.

7. The process of claim 6 wherein said styrene compound is selected from the group consisting of styrene, alpha-methylstyrene and mixtures thereof.

8. The process of claim 7 wherein said noble metal based catalyst is selected from the group consisting of rhodium trichloride, palladium dichloride, palladium dioxide and ruthenium trichloride.

9. The process of claim 8 wherein said starting compound is styrene and said indane is 1-methyl-3-phenyl indane.

10. The process of claim 8 wherein said styrene compound is alpha-methylstyrene and said indane is 1,1,3-trimethyl-3-phenyl indane.

References Cited

UNITED STATES PATENTS 2,595,581 5/1952 Highet et al. _____ 260—669
3,385,905 5/1968 Smith et al. ____ 260—669 XR
3,390,195 6/1968 Chappell et al. __ 260—669 XR DELBERT E. GANTZ, Primary Examiner C. R. DAVIS, Assistant Examiner